(12) United States Patent
Dufty

(10) Patent No.: US 6,460,624 B1
(45) Date of Patent: Oct. 8, 2002

(54) GROUND AERATION APPARATUS

(76) Inventor: Raymond Jeffrey Dufty, P.O. Box 70, Southport 4215 (AU)

( * ) Notice: Subject to any disclaimer, the term of this patent is extended or adjusted under 35 U.S.C. 154(b) by 0 days.

(21) Appl. No.: 09/486,024

(22) PCT Filed: Aug. 21, 1998

(86) PCT No.: PCT/AU98/00667

§ 371 (c)(1),
(2), (4) Date: May 5, 2000

(87) PCT Pub. No.: WO99/09802

PCT Pub. Date: Mar. 4, 1999

(30) Foreign Application Priority Data

Aug. 21, 1997 (AU) ............................................. 35203/97

(51) Int. Cl.[7] .......................... A01B 45/02; A01B 45/00; A01B 1/12
(52) U.S. Cl. .......................... 172/21; 172/540; 172/554
(58) Field of Search .............................. 172/21, 22, 42, 172/118, 120, 121, 122, 540, 554; 47/101 R; 404/122, 123, 124, 125, 127

(56) References Cited

U.S. PATENT DOCUMENTS

| 2,601,752 | A | * | 7/1952 | Rose | 172/42 |
|---|---|---|---|---|---|
| 3,739,856 | A | * | 6/1973 | Ray | 172/21 |
| 4,158,391 | A | | 6/1979 | Clements | |
| 4,619,329 | A | * | 10/1986 | Gorbett | 172/21 |
| 5,533,577 | A | * | 7/1996 | Jucker | 172/21 |
| 5,690,179 | A | * | 11/1997 | Dickson | 172/21 |
| 6,179,061 | B1 | * | 1/2001 | Fiore | 172/21 |

FOREIGN PATENT DOCUMENTS

| AU | 111662 | | 10/1940 | |
| AU | 154008 | * | 6/1952 | 172/21 |
| AU | 151191 | | 4/1953 | |
| AU | 227245 | | 9/1958 | |
| AU | 252906 | * | 5/1963 | 172/21 |
| AU | 254567 | | 9/1964 | |
| AU | 50015/79 | | 8/1978 | |
| GB | 883824 | * | 12/1961 | 172/21 |
| GB | 1427718 | * | 2/1976 | 172/21 |
| GB | 2068704 | * | 8/1981 | 172/21 |

* cited by examiner

Primary Examiner—Thomas B. Will
Assistant Examiner—Nathan Mammen
(74) Attorney, Agent, or Firm—Matthews, Collins, Shepard & McKay, P.A.

(57) ABSTRACT

Ground aeration apparatus (10) having a main frame (11) which has one or more ground contacting rollers in the form of a main drive roller (22) and a plurality of smoothing rollers (13, 14, 15) mounted to an undercarriage (12) attached to the underside of the main frame (11). There is also provided a slicing mechanism (25) which comprises spaced cutters (31, 32) mounted to a support axle (30). In use, a grass surface may be subjected to a rolling or smoothing operation as well as an aeration operation.

5 Claims, 7 Drawing Sheets

GROUND AERATION APPARATUS

FIELD OF THE INVENTION

THIS INVENTION relates to ground slicing apparatus which may be utilized for aeration of grass surfaces, such as lawns, golfing greens and bowling greens.

BACKGROUND OF THE INVENTION

Aeration of grass surfaces can be carried out by scarifying, coring and/or slicing operations. Scarifying of golf greens is a time consuming process which is usually only carried out on a seasonal basis and involves the use of dethatching apparatus which involves removal of a top section of grass or turf in rows 25–40 mm apart and at a depth of between 3–5 mm. Scarifying is a necessary prerequisite for golf greens in that it is necessary to reduce the thatched surface layer or grass density. Unless such reduction is carried out, golfing greens will develop a matted surface layer which is substantially impervious to flow of liquid therethrough and thus inhibits moisture or fertilizer from reaching the root system.

Scarifying of golfing greens as described above is disadvantageous in that it is a messy operation leaving grass clippings and dirt on the surface of the golfing green.

After scarifying, the greens require top dressing which leaves the surface of the grass at an undesirable consistency or very uneven state having surface irregularities thereby presenting a bumpy track for passage of a golf ball which makes the ball difficult to putt in a straight line as the ball will frequently deviate or wander off-line.

Conventional scarifying apparatus includes a main frame having ground engaging wheels which are driven by drive means, such as an internal combustion motor mounted on the main frame. There is also usually included a sub-frame which may be raised or lowered relative to the main frame. There is also included an axle connected to the drive motor by a suitable drive train so as to be rotated thereby when required. There was also included a plurality of circular cutters mounted to the axle at spaced intervals which penetrated the ground when the sub-frame was in the lowered position to carry out the aforementioned dethatching operations. Scarifying apparatus of this type is described in Australian Patent Specification No. 53371/79.

Coring of golfing greens is carried out by drilling or punching the ground surface with a plurality of hollow tubes which after subsequent withdrawal from the ground contain solid cores of vegetation leaving a plurality of holes. Usually the hollow tubes penetrate the ground 50–100 mm and are attached to a support frame which reciprocates upwardly and downwardly relative to a main frame of the coring apparatus. The main frame may be connected by a right angle gear mechanism to a drive motor mounted on the main frame. The purpose of coring is to relieve compaction of the golfing green surface and facilitates top dressing to be dropped into the holes imparted to the green. A conventional coring apparatus is described in International Publication No. WO93/119580 which in lieu of hollow tubes uses rotational drilling members which are rotated by an endless chain associated with a coring head attached to one end of the main frame.

Ground slicing is usually carried out by a roller assembly having a plurality of slicers or cutters fixedly attached thereto which sliced the ground upon rotation of the roller assembly. Usually the roller assembly was free-wheeling and was rotated when attached to a drawbar of a tractor. A tumbling slicer of this type is described in Australian Patent No. 672352 and was disadvantageous in that the tractor was usually not allowed to travel on golfing greens or, if it did, left undesirable marks due to movement of the wheels of the tractor on the green. Also, the cutters or slicers attached to the roller also imparted undesirable marks or tracks on the green.

Usually, in relation to maintenance of golfing greens, it was normally necessary to carry out a scarifying operation twice per year and a coring operation twice per year. Such maintenance was relatively expensive and time consuming and, in some cases, meant that setting appropriate dates for tournaments was relatively difficult because it usually took a period of time of 3–4 weeks for the golfing green to recover from the scarifying or coring operation to achieve a true even surface.

Reference is also made to AU 254567 which refers to a combined compacting roller/ground aerator wherein the ground aeration apparatus is located behind both the drive roller and a smoothing roller or idler roller (i.e. having regard to one direction of travel). This particular apparatus is considered to be disadvantageous in that after one traverse any soil disturbance will remain in the ground and it is therefore necessary that a further traverse be made over the same ground to remove the soil disturbance by operation of the driven roller. Also, in this apparatus, in order to adjust the position of the ground aeration apparatus, it was necessary to undo a bolt when the apparatus was at rest and adjust the ground aeration apparatus a new position which could be a disengaged position or an operative position where the ground aeration blades penetrate the ground. This arrangement was also found to be time consuming and cumbersome.

SUMMARY OF THE INVENTION

It therefore is an object of the invention to provide ground slicing apparatus which may alleviate one or more disadvantages of the prior art described above.

Ground slicing apparatus of the invention includes a main frame supporting:
  (i) a drive roller;
  (ii) at least one smoothing roller,
  (iii) slicing means located intermediate the drive roller and the said at least one smoothing roller wherein said slicing means comprises an axle having a plurality of slicer blades mounted thereto at spaced intervals along the axle wherein said axle is subject to rotation so that the slicer blades penetrate the ground in use;
  (iv) a sub-frame carrying the axle which is movable from an inoperative position clear of the ground to an operation position whereby the slicer blades penetrate the ground; and
  (v) remote-controlled pressurizing means maintaining pressure on the axle in the operative position to firmly retain the axle in the operative position.

Each of the slicer blades may be rigidly attached to the support axle and, in this regard, the support axle may be rotated through a suitable drive train being associated with a drive motor mounted on the main frame. Alternatively, the support axle may be free-wheeling so that it rotates upon ground contact.

The drive train may therefore comprise a drive sprocket or pulley having a belt drive or chain drive which is drivably connected to the drive means such as a drive motor located on the main frame. Usually a gear box or reduction gear is interposed between the drive motor and the sprocket or pulley.

In one form, the cutters or slicer blades may be circular in shape having a plurality of peripheral teeth. In another arrangement, the cutters may be in the shape of a rectangle or triangle or any other geometrical shape which Includes a plurality of spaced points or apices. Preferably, in this arrangement, each adjacent cutter is offset relative to each other to facilitate rotation of the support axle.

The drive roller may be directly coupled to the drive motor through a suitable gear box which is located on the main frame, Preferably the drive roller has stub axles or a single axle which engages with bearings located at each end of the drive roller. There also may be included an undercarriage having attached thereto one or more, preferably a plurality, of the smoothing rollers which are preferably each adapted for free-wheeling upon ground contact. Each of the smoothing rollers may be provided with stub axles mounted for idler rotation with suitable bearings located in the undercarriage.

To enhance the pivotal movement of the sub-frame relative to the main frame, the sub-frame may be provided with opposed longitudinal frame members or shafts which are attached directly to the main frame or, more preferably, to bearings associated with the drive roller as described above.

There also may be provided actuating means for actuating movement of the auxiliary frame from the operative to inoperative position and vice versa and this may comprise an actuating handle which is connected to the sub-frame through linkage means. In one form, the linkage means may comprise a connection rod rigidly attached to the handle which is suitably substantially vertically oriented which connection rod is also attached to a foot slidably mounted to the sub-frame or, more preferably, to a support housing attached to or integral with the sub-frame. Preferably the actuating means is such that the linkage means provides an overcentre locking action on the sub-frame in the operative position. Therefore, the foot may constitute one form of pressurizing means

BRIEF DESCRIPTION OF THE DRAWINGS

Reference is now made to a preferred embodiment of the invention as shown in the attached drawings, wherein:FIG.

DETAILED DESCRIPTION OF THE PREFERRED EMBODIMENT

Figure 1:
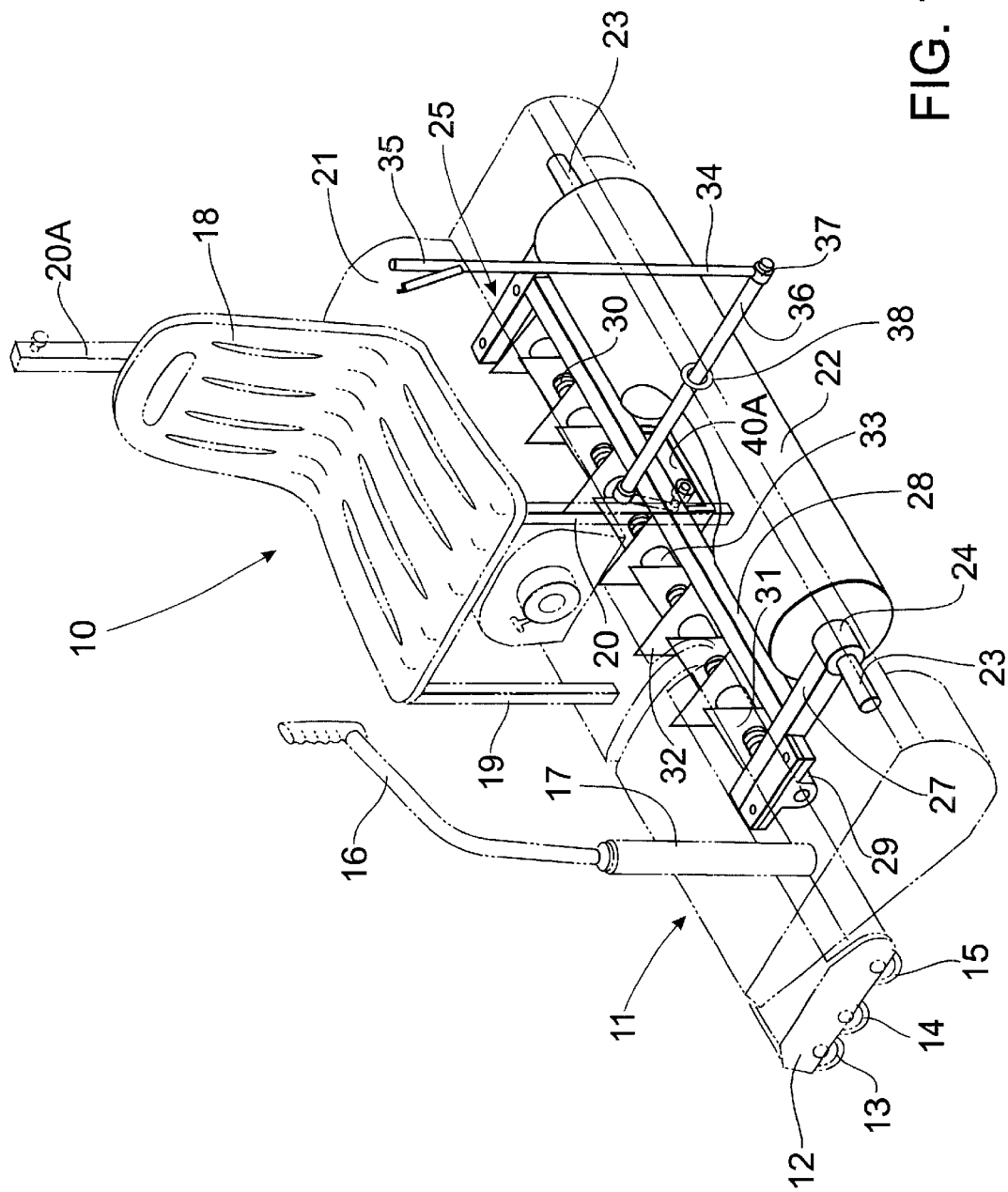
FIG. 1 represents a perspective view of ground slicing apparatus constructed in accordance with the invention.

In the drawings, there is shown ground slicing apparatus 10 having a main frame or chassis 11, undercarriage 12 housing three smoothing rollers 13, 14 and 15, joystick 16 for controlling movement of smoothing rollers 13, 14 and 15 which is connected thereto by a suitable linkage mechanism (not shown), bearing column 17 for joystick 16, seat 18 attached to uprights 19, 20 and 20A, gear box and motor housing 21 and main drive roller 22 having stub axles 23 and bearings 24.

Figure 4:
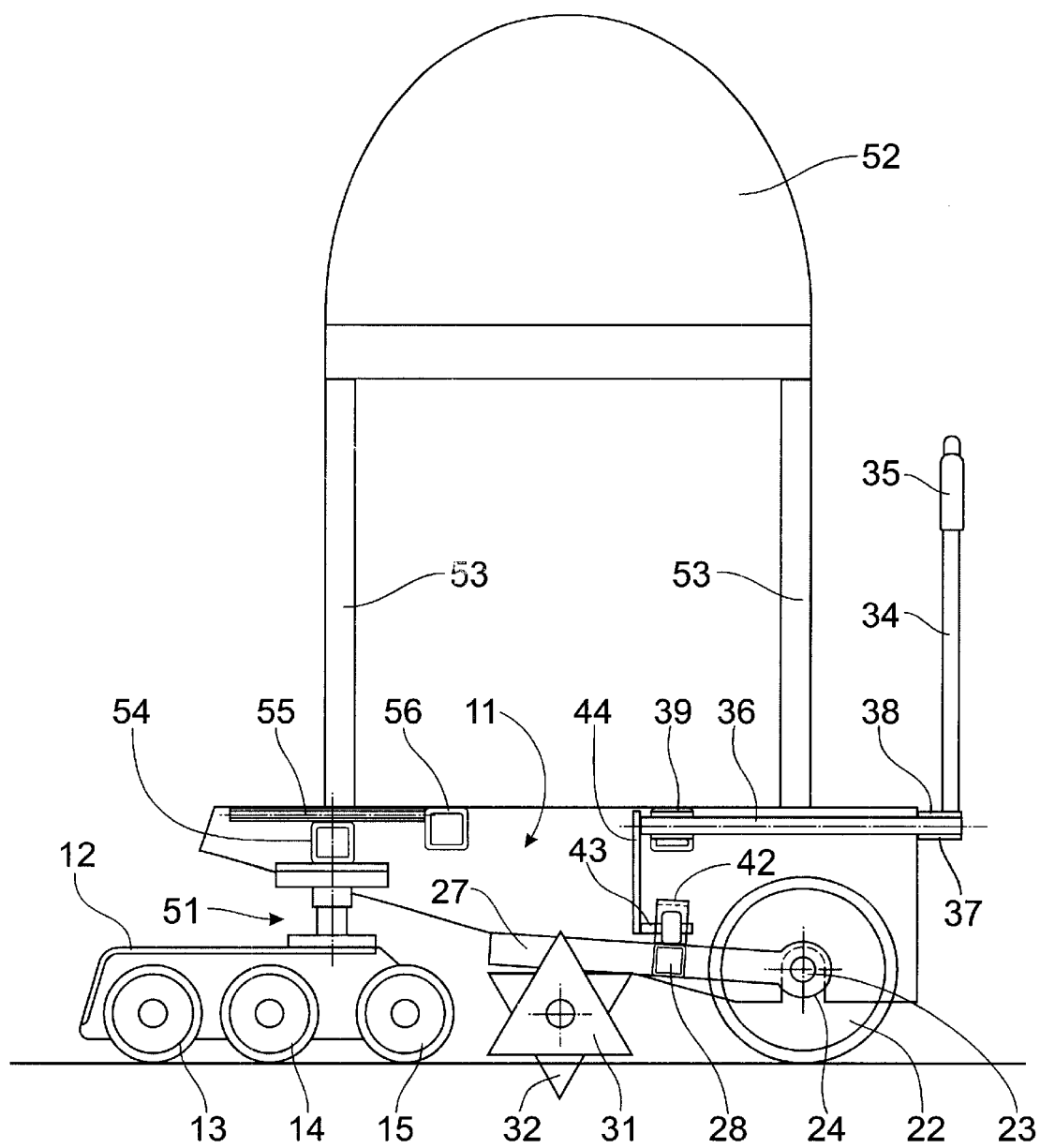
FIG. 4 is a side view of the rolling apparatus of FIG. 1 with the slicing mechanism in an operative position.

There is shown slicing mechanism 25 mounted on chassis 11 and which includes frame 26 comprising longitudinal shafts 27 interconnecting bearings 24 and support axle 30 which has bearings 29 attached at each end. Frame 26 also includes transverse shaft 28 interconnecting shafts 27. Axle 30 extends through bearings 29 and has mounted thereon triangular shaped blades or cutters 31 and 32 at spaced intervals being separated by spacers 33. The axle 30 is hexagonal shaped in cross section as shown in FIG. 4. As shown in FIG. 4, blades 31 are mounted to axle 30 at a different orientation to blades 32.

There is also shown actuating handle 34 having gripping part 35 which handle 34 is rigidly connected to connecting rod 36 at 37. As best shown in FIG. 4, the actuating handle 34 is supported on chassis 11 and, in this regard, connection rod 36 extends through mounts 38 and 39 attached to chassis 11. These mounts are omitted from FIGS. 1–2 for the sake of convenience.

Figure 2:
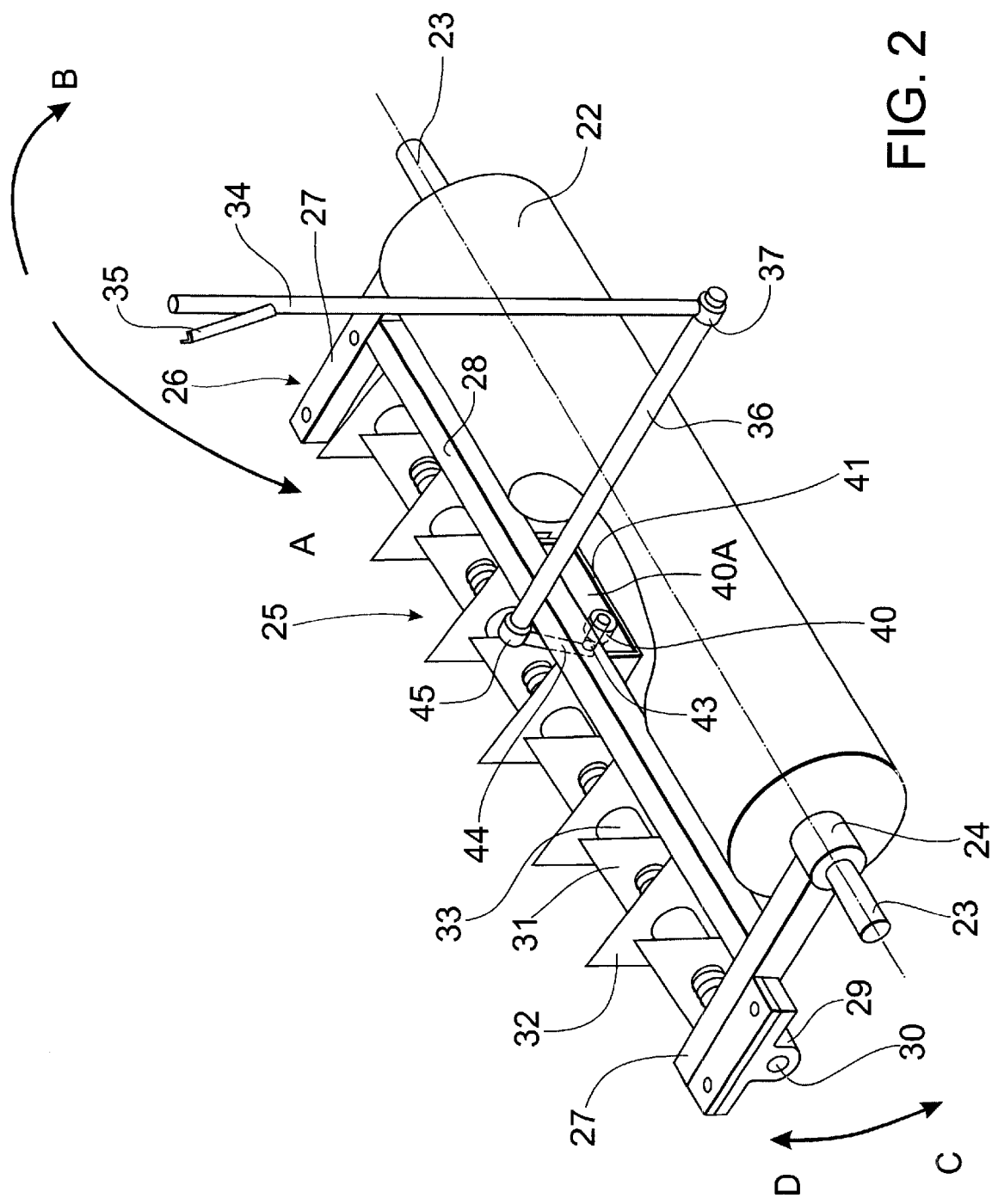
FIG. 2 is a perspective view of the ground slicing apparatus as shown in FIG. 1 showing the slicing mechanism.

There is also shown a slide 40, which as shown in FIGS. 1–2, is restrained within housing 41 which is attached to an underside of shaft 28 and may press downwardly on the base wall 40A of housing 40 when the frame 26 is in the operative position. Alternatively slide 40 may engage within housing 42 which is attached to a top surface of shaft 28 as shown in FIG. 4. The purpose of the housing 41 or 42 is to restrain movement of slide 40 within the limits required to elevate or lower frame 26 and inhibit frame 26 from oscillating when ground aeration apparatus 10 is being transported. Slide 40 is in the form of a roller and is attached to foot 43 which includes shaft 44 which is attached to connection rod 36 at 45.

Figure 5:
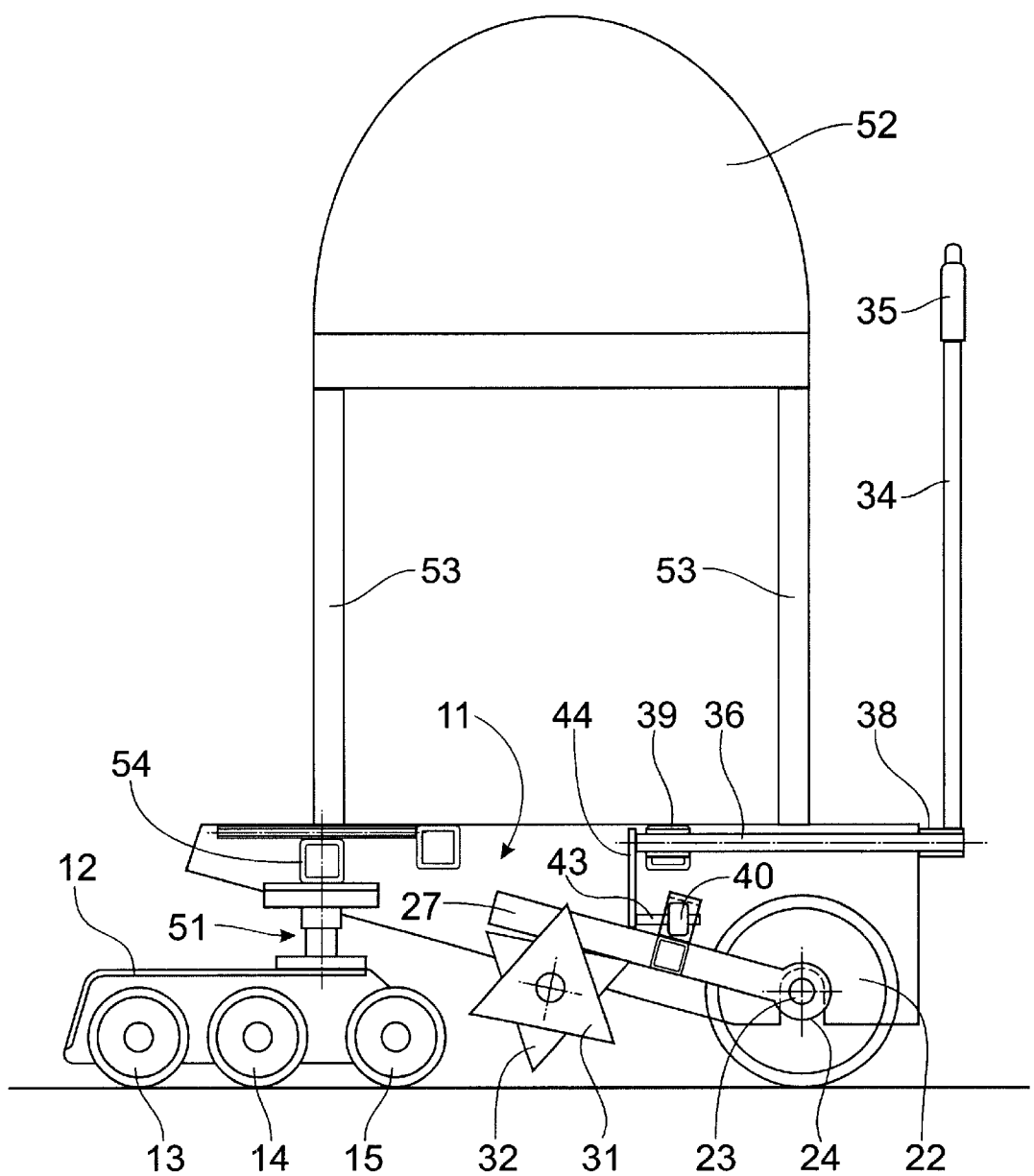
FIG. 5 is a similar view to FIG. 4 showing the slicing mechanism in an inoperative position.

The operation of actuating handle 34 is shown in FIG. 2 wherein movement of handle 34 towards A causes lowering of frame 26 to thereby facilitate slicing mechanism 25 to move in the direction of C to engage the ground and thus penetrate the soil. On the other hand, movement of handle 34 towards B causes corresponding movement of slicing mechanism 25 towards D and thus elevate frame 26 above the ground. This is shown in FIGS. 4–5.

Figure 3:
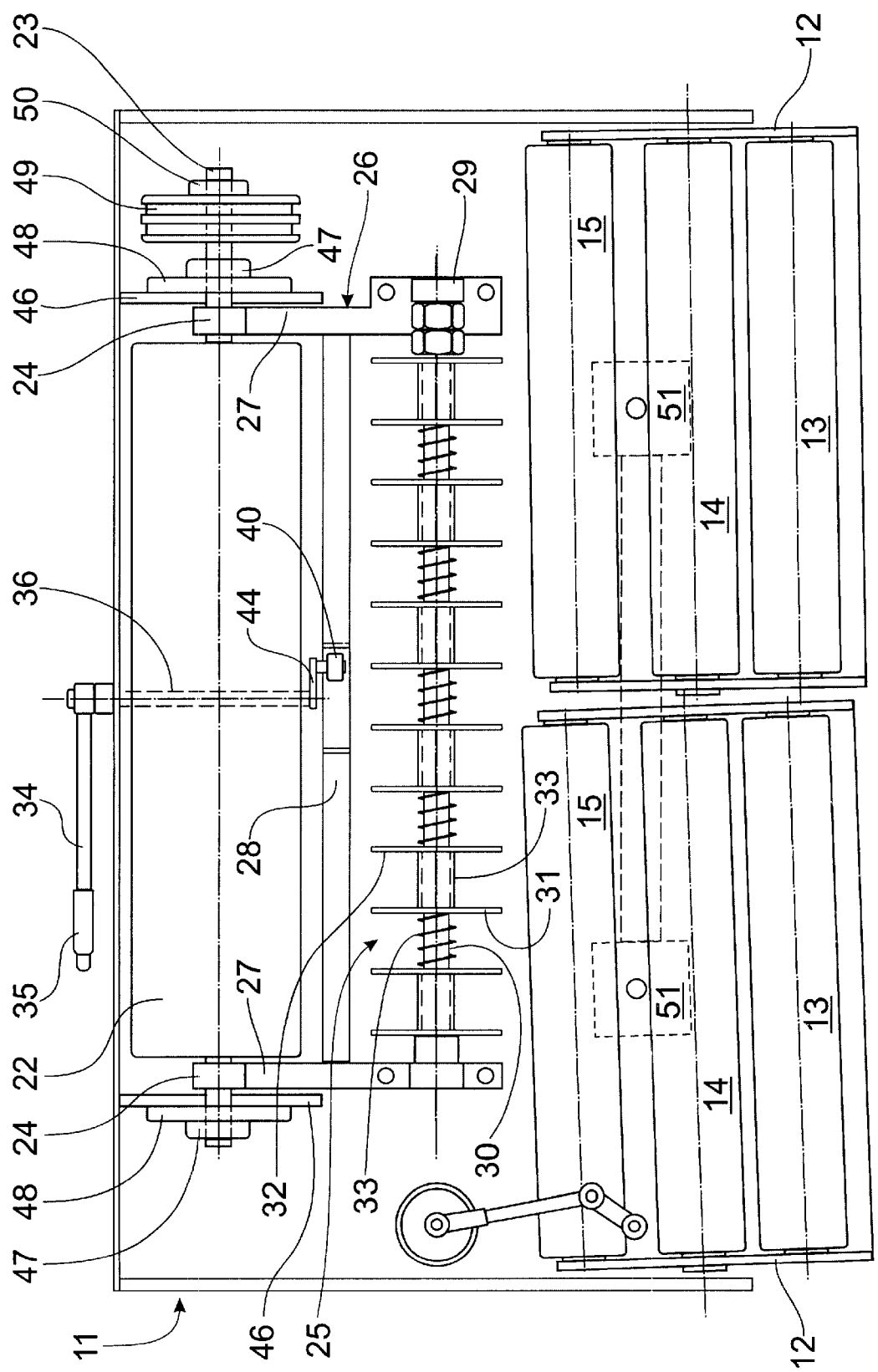
FIG. 3 is a bottom plan view of the ground slicing apparatus as shown in FIG. 1.

In FIG. 3, there is also shown mounting plates 46 for axles 23 of roller 22, bearings 47, bearing carriers 48, sprocket 49 which is drivably connected to the motor mounted on chassis 11 by a suitable drive train (not shown) and sprocket mount 50. Each of undercarriages 12 may be pivotably attached by pivot assemblies 51 to chassis 11.

In FIG. 4, reference is also made to canopy 52 mounted to chassis 11 by uprights 53. Pivot assemblies 51 are attached to control beam 54 which may be pivoted about a horizontal axis by pivot assembly 55 attached to chassis 11. This mechanism facilitates the movement of undercarriages 12 to move in unison when required. There is also shown frame member 56 attached to chassis 11.

Figure 6:
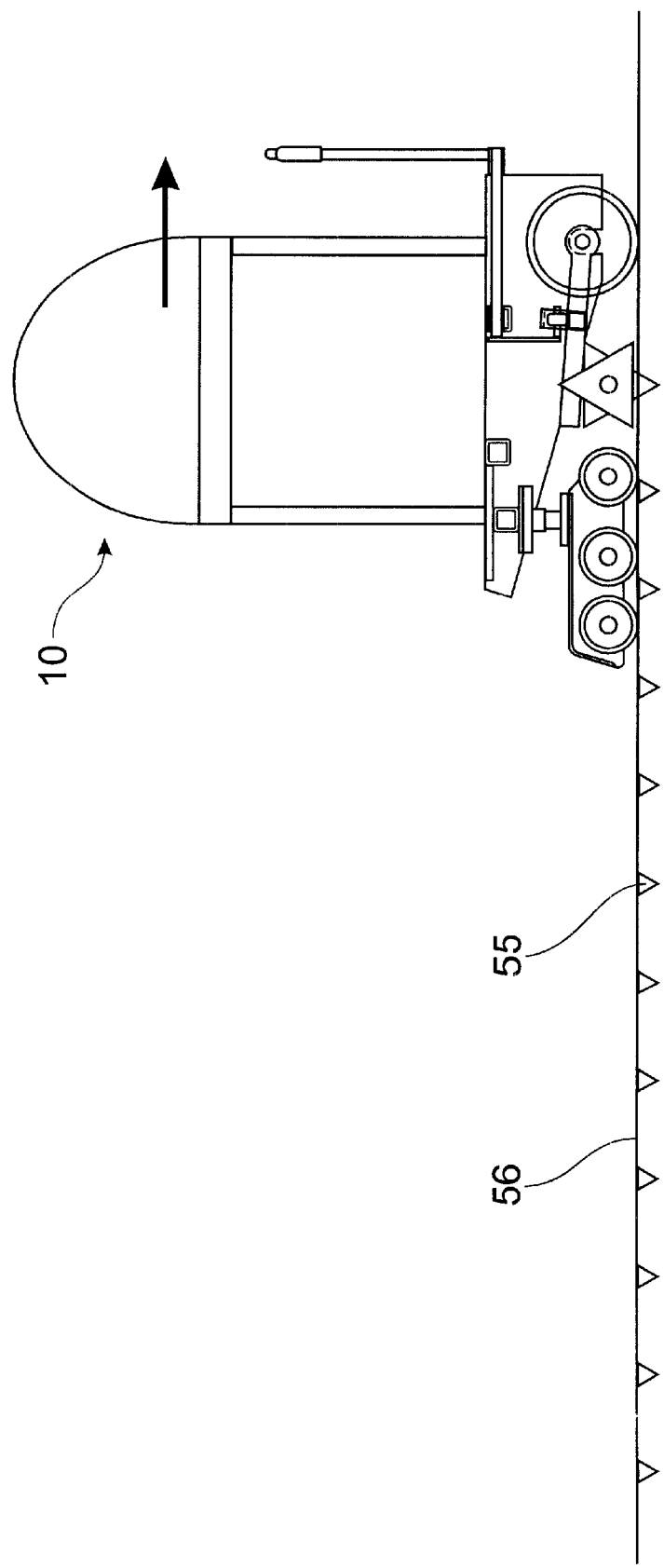
FIG. 6 is a similar view to FIG. 4 showing the formation of V-shaped slices in the ground after passage of the rolling apparatus.
Figure 7:
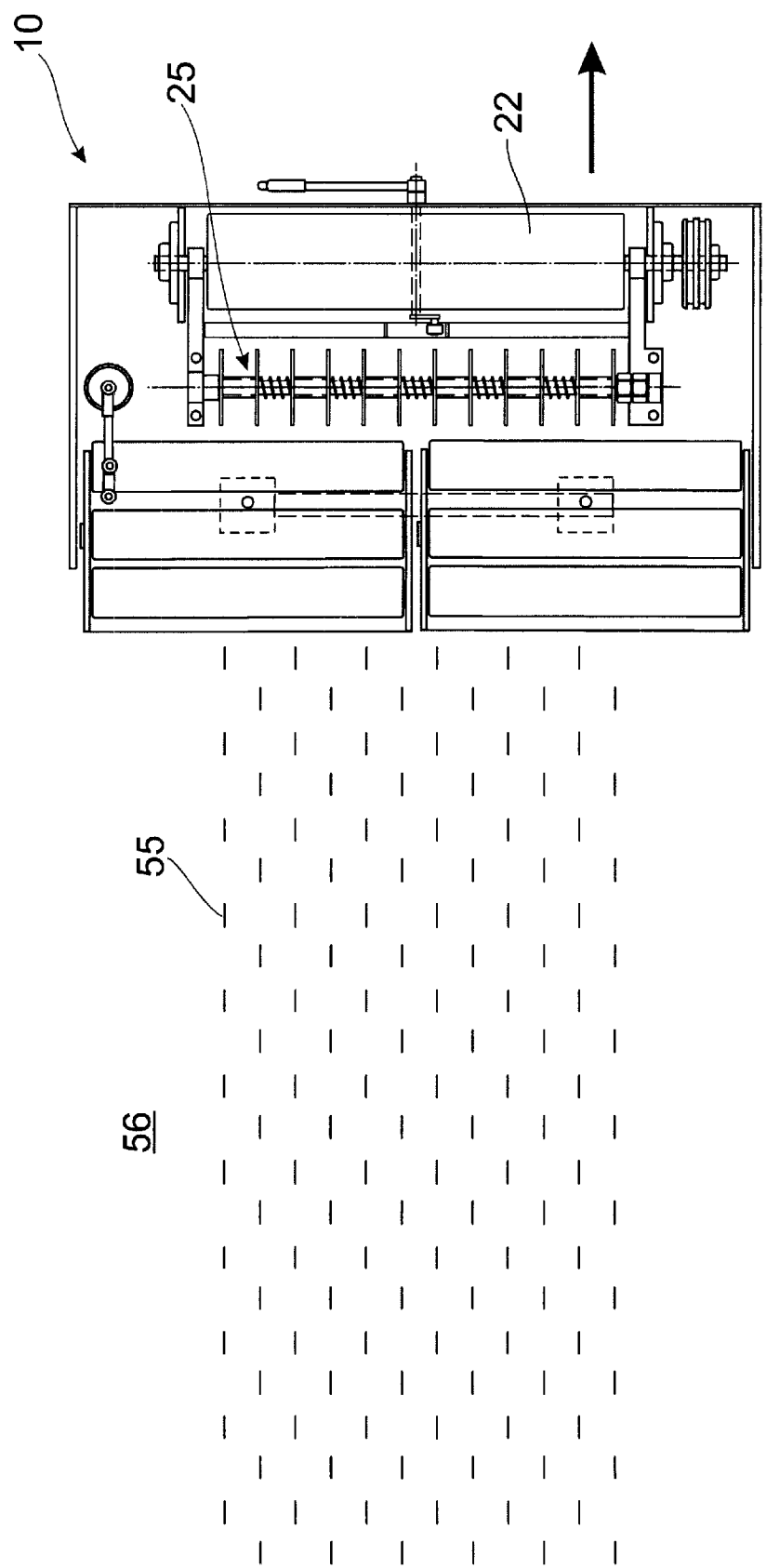
FIG. 7 is a plan view of the apparatus shown in FIG. 6.

In FIGS. 6–7, operation of ground aeration apparatus 10 is shown wherein slicing mechanism 25 causes V-shaped slices 55 to be imparted to the ground 56 after travelling to the right as shown by the arrow in full outline. Slicing the ground of golfing greens and bowling greens has the advantage that the ground is then aerated facilitating the ingress of surface moisture to the root systems of the turf or grass. The method of slicing the greens which is accomplished by the ground slicing apparatus of the present invention therefore can be carried out efficiently whereby the least amount of damage is Imparted to the grass surface.

This is achieved by initial slices or divots imparted to the ground by slicing mechanism 25 being pressed down by either drive rollers 22 or smoothing rollers 13, 14 or 15.

Thus, the slices 55 do not have any raised or elevated projections or bumps and this will be achieved by a single traverse of chassis 11.

It will also be appreciated from the foregoing that each blade 31 and 32 may be rotated when in contact with the ground or alternatively, the axle 30 may be rotated by being interconnected to axle 23 of main drive roller 22 by a suitable coupling or connection (e.g. by a V belt-pulley system or chain and sprocket system)y. Therefore, axle 23 may be rotated at the same speed of roller 22 or at a variable speed. The blades 31 and 32 may be spaced evenly or variably along axle 30 as may be required Spacers 33 may comprise tubes, springs, a combination of tubes and springs or any other suitable form of spacer.

It will also be appreciated that blades 31 and 32 are offset in relation to each other so as to provide a continuous propelling force on the axle 30 to facilitate efficient slicing of the ground as described whereby a series of spaced points on adjacent blades 31 and 32 may achieve this objective.

It also will be appreciated that the frame 26 which carries the slicing mechanism 25 may be subject to downward pressure when in the operational position as shown in FIG 4 and this may be achieved by the use of housing 41 or 42 wherein slider 40 is subject to a downward force by being in contact with shaft 28 as shown in FIG. 4 or housing 41 as shown in FIG. 2. In any event, it will be appreciated that when handle 34 is in the locked position as shown in FIG. 4 that foot 43 is locked in an overcentre position pressing blades 31 and 32 firmly into the ground.

It will also be appreciated that firm pressure on frame 26 can also be achieved by suitable hydraulic, pneumatic or other mechanical means which Is alternative to the specific form which is illustrated and discussed above.

It therefore will be appreciated that the invention, in its broadest sense, covers a combined rolling/ground slicing apparatus whereby ground aeration in the form of slicing may be carried out when the grass surface is being rolled to provide minimal ground disturbance. This provides a versatile ground aeration apparatus which facilitates rolling or smoothing of the grass surface simultaneously with ground slicing operations. The use of the ground slicing apparatus of the invention will also reduce the number of times it is necessary to scarify or core golfing greens which will reduce maintenance costs.

It will also be appreciated from the foregoing description of the preferred embodiment that the slicing apparatus of the invention is extremely advantageous in use in that the pressurizing means is remote-controlled and thus the pressurizing means can be actuated when the apparatus is in a travelling mode. It will also be appreciated that by having the slicing apparatus intermediate the drive roller and the smoothing or idler rollers that any ground disturbance created by the slicing apparatus will be automatically removed by either the drive roller or the smoothing rollers upon one traverse and thus also creates for efficient operation.

What is claimed is:

1. Ground slicing apparatus comprising a main frame supporting:

(i) a single drive roller extending transversely of the main frame;

(ii) at least one smoothing roller;

(iii) slicing means located intermediate the drive roller and the said at least one smoothing roller wherein said slicing means comprises a support axle having a plurality of slicer blades mounted thereto at spaced intervals along the axle wherein said axle is subject to rotation so that the slicer blades penetrate the ground in use;

(iv) a sub-frame carrying the axle which is movable from an inoperative position clear of the ground to an operation position whereby the slicer blades penetrate the ground; and (v) remote-controlled pressurizing means maintaining pressure on the axle in the operative position to firmly retain the axle in the operative position, wherein said pressurizing means comprises a movable bearing member or foot which bears against the sub-frame or extension or appendage thereof, wherein there is provided an actuating handle connected to the bearing member or foot by linkage means to actuate movement of the bearing member or foot, whereby said linkage means includes a connection rod attached to the actuating handle, which connection rod also supports said bearing member or foot.

2. Ground slicing apparatus as claimed in claim 1, wherein there is provided a shaft interconnecting the connection member and said bearing member or foot.

3. Ground slicing apparatus as claimed in claim 2, wherein the foot includes a slide slidably engaging the sub-frame or extension or appendage thereof.

4. Ground slicing apparatus as claimed in claim 3, wherein the extension or appendage includes a housing attached to the sub-frame controlling movement of the foot.

5. Ground slicing apparatus as claimed in claim 1, wherein the bearing member or foot engages the sub-frame in an overcentre locking position, when said sub-frame is in the operative position.

\* \* \* \* \*